United States Patent
Grisco et al.

(10) Patent No.: US 10,454,775 B2
(45) Date of Patent: *Oct. 22, 2019

(54) DEVICE AND SERVICE DISCOVERY ACROSS MULTIPLE NETWORK TYPES

(71) Applicant: ServiceNow, Inc., Santa Clara, CA (US)

(72) Inventors: Gregory Grisco, San Diego, NC (US); Steve Francis, La Jolla, CA (US); Shridhar Bylahalli, Karnataka (IN)

(73) Assignee: ServiceNow, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/151,095

(22) Filed: Oct. 3, 2018

(65) Prior Publication Data
US 2019/0190786 A1    Jun. 20, 2019

Related U.S. Application Data

(63) Continuation of application No. 16/055,652, filed on Aug. 6, 2018, now abandoned, which is a
(Continued)

(51) Int. Cl.
*G06F 15/173* (2006.01)
*H04L 12/24* (2006.01)
(Continued)

(52) U.S. Cl.
CPC .......... *H04L 41/12* (2013.01); *G06F 16/2282* (2019.01); *G06F 16/27* (2019.01);
(Continued)

(58) Field of Classification Search
None
See application file for complete search history.

(56) References Cited

U.S. PATENT DOCUMENTS 5,978,594 A    11/1999  Bonnell
6,182,136 B1 *  1/2001  Ramanathan ........... H04L 29/06
                                                  709/202
(Continued)

FOREIGN PATENT DOCUMENTS

EP    2838028 A1    2/2015
JP    2010113677 A    5/2010
WO    2017059324 A1    4/2017

OTHER PUBLICATIONS

Examination Report for Australian Patent Application No. 2018200021 dated Dec. 7, 2018; 6 pgs.
(Continued)

*Primary Examiner* — Phuoc H Nguyen
(74) *Attorney, Agent, or Firm* — Fletcher Yoder PC

(57) ABSTRACT

A computer network discovery system may involve a computing system and a database disposed within a remote network management platform, and a proxy server application disposed within an enterprise network. The computing system may be configured to: transmit first instructions causing the proxy server application to obtain configuration and operational information for virtual machines; store the configuration and operational information for the virtual machines in a first set of tables of the database; transmit second instructions causing the server device to obtain configuration and operational information for services; and store the configuration and operational information for the services in a second set of tables of the database, where the first set and the second set of tables have tables in common that store at least part of the configuration and operational information for the virtual machines and the services.

20 Claims, 10 Drawing Sheets

Related U.S. Application Data continuation of application No. 15/847,464, filed on Dec. 19, 2017, now Pat. No. 10,044,566.

(51) Int. Cl.
*G06F 16/27* (2019.01)
*G06F 16/22* (2019.01)
*G06F 9/455* (2018.01)

(52) U.S. Cl.
CPC .......... *H04L 41/22* (2013.01); *G06F 9/45558* (2013.01); *G06F 2009/45595* (2013.01)

(56) References Cited

U.S. PATENT DOCUMENTS

| | | | |
|---|---|---|---|
| 6,321,229 | B1 | 11/2001 | Goldman |
| 6,353,446 | B1 | 3/2002 | Vaughn et al. |
| 6,816,898 | B1 | 11/2004 | Scarpelli et al. |
| 6,895,586 | B1 | 5/2005 | Brasher |
| 7,027,411 | B1 | 4/2006 | Pulsipher |
| 7,392,300 | B2 | 6/2008 | Anantharangachar |
| 7,617,073 | B2 | 11/2009 | Trinon |
| 7,877,783 | B1 | 1/2011 | Cline |
| 7,945,860 | B2 | 5/2011 | Vambenepe |
| 8,554,750 | B2 | 10/2013 | Rangaranjan |
| 9,477,572 | B2 | 10/2016 | Suit |
| 9,813,353 | B1 | 11/2017 | Suit |
| 2002/0152294 | A1 | 10/2002 | Evans et al. |
| 2002/0173984 | A1 | 11/2002 | Robertson et al. |
| 2008/0243900 | A1 | 10/2008 | Yohanan et al. |
| 2010/0268768 | A1 | 10/2010 | Kurtenbach et al. |
| 2013/0185586 | A1* | 7/2013 | Vachharajani ......... H04L 45/44 714/2 |
| 2013/0346619 | A1 | 12/2013 | Panuganty et al. |
| 2015/0127788 | A1 | 5/2015 | Vittal et al. |
| 2015/0139238 | A1 | 5/2015 | Pourzandi et al. |
| 2015/0341230 | A1 | 11/2015 | Dave et al. |
| 2017/0097841 | A1 | 4/2017 | Chang et al. |
| 2018/0006884 | A1* | 1/2018 | Zimmermann ....... G06F 9/5077 |

OTHER PUBLICATIONS

ServiceNow, ServiceNow Documentation (Discover an Amazon Web Services (AWS) cloud), Feb. 20, 2017 (downloaded from public web site http://docs.servicenow.com).

ServiceNow, Cloud Management product overview, Feb. 20, 2017 (downloaded from public web site http://docs.servicenow.com).

ServiceNow, Device Classifications, Feb. 1, 2017 (downloaded from public web site http://wiki.servicenow.com).

ServiceNow, Discovery Agentless Architecture, Feb. 1, 2017 (downloaded from public web site http://wiki.servicenow.com).

ServiceNow, ServiceNow Documentation (Data collected by discovery), Feb. 20, 2017 (downloaded from public web site http://docs.servicenow.com).

ServiceNow, ServiceNow Documentation (Discovery for VMware), Feb. 21, 2017 (downloaded from public web site http://docs.servicenow.com).

Second Examination Report for Australian Patent Application No. 2018200021 dated Mar. 25, 2019, 5 pgs.

* cited by examiner

DEVICE AND SERVICE DISCOVERY ACROSS MULTIPLE NETWORK TYPES

CROSS-REFERENCE TO RELATED APPLICATIONS

This application is a continuation of and claims priority to U.S. patent application Ser. No. 16/055,652, filed Aug. 6, 2018, which is a continuation of U.S. patent application Ser. No. 15/847,464, filed Dec. 19, 2017, issued as U.S. Pat. No. 10,044,566, which is a continuation of U.S. patent application Ser. No. 15/654,930, filed Jul. 20, 2017, which is hereby incorporated by reference in its entirety. U.S. patent application Ser. No. 15/654,930 claims priority to Indian patent application no. 201711015994, filed May 5, 2017, which is also hereby incorporated by reference in its entirety.

BACKGROUND

As an enterprise employs more and more cloud-based networks, such as remotely hosted services managed by a third party, it becomes difficult to manage the resources (e.g., virtual machines and storage capacity) provided by the cloud-based networks. The enterprise might have tools with which to discover and manage devices and services on its own network. These tools, however, are insufficient for discovering and managing cloud-based networks, devices, and services. As a consequence, the enterprise is unable to account for and use all of its computing assets in a unified fashion.

SUMMARY

It is now common for enterprise networks to include tens of thousands of devices across dozens of networks, supporting thousands of users. Enterprise networks may also employ one or more third-party cloud-based networks for application development, data storage, and service hosting (e.g., web hosting). Advantageously, the hardware and much of the software that make up a cloud-based network are managed by the third party, which allows the enterprise to focus on its specific technical goals, rather than have to administer the day-to-day operations of these cloud-based resources.

The addition of third-party cloud-based networks extends the computing and storage capabilities of the enterprise. However, cloud-based networks are arranged differently from devices and servers on the enterprise network, and are typically managed through different interfaces from those of the enterprise network. Further, different cloud-based networks may provide distinct management interfaces. As a consequence, it can be burdensome for users within the enterprise network to allocate tasks and data between the enterprise network and one or more cloud-based networks. It is also difficult to clearly define the relationships between two different computing, storage, or service resources in the same cloud-based network, much less between computing, storage, or service resources in a cloud-based network and those in the enterprise network or a different cloud-based network.

A unified system for discovering, managing, and storing information regarding both enterprise and cloud-based network components is presented herein. At a remote network management platform, a user of an enterprise network may enter information regarding the enterprise network and cloud-based networks employed by the enterprise network. The remote network management platform may initiate discovery of devices and services (including virtual machines) provided by both the enterprise and the cloud-based networks.

The enterprise may, for example, include a proxy server that communicates with the remote network management platform. By way of the proxy server, the remote network management platform may securely probe the enterprise network equipment to determine device types and services supported thereon. For virtual machines employed by the enterprise, a centralized server device or application may contain information regarding the configuration of each machine. In this way, a view of the enterprise network is built and stored in a data model at the remote network management platform. From user interfaces associated with this data model, enterprise devices and services can be managed.

In contrast, the remote network management platform may be provisioned with the enterprise's account credentials for a third-party cloud-based network. The remote network management platform may then probe this account for resources allocated thereto. These resources may include virtual machines, and the computing, communications, memory elements assigned to each. These resources may also include applications, web sites, and databases.

Advantageously, the remote network management platform may store this information in the same data model in which the enterprise network information is stored. Doing so eases the design of user interfaces that unify the presentation of enterprise and cloud-based networks, and requires less storage, since the only one data model is required. Furthermore, the user interfaces may present information regarding the computational resources of the enterprise network and its cloud-based networks in a common format, thereby improving the experience for enterprise network users. By way of such user interfaces, relationships and dependencies between sets of cloud-based resources, and/or between cloud-based resources and enterprise resources, may be defined.

Accordingly, a first example embodiment may involve a computer network discovery system including a computing system disposed within a remote network management platform, a database disposed within the remote network management platform, and a proxy server application operating on a proxy server device disposed within an enterprise network. The enterprise network may use the computing system to manage devices and services on the enterprise network. The computing system may be configured to: transmit first instructions to the proxy server application, where reception of the first instructions cause the proxy server application to obtain, from a virtual machine manager device of the enterprise network, configuration and operational information for a plurality of virtual machines managed by the virtual machine manager device; receive, from the proxy server application, the configuration and operational information for the plurality of virtual machines; store the configuration and operational information for the plurality of virtual machines in a first set of tables of the database; transmit second instructions to a server device, where reception of the second instructions cause the server device to obtain configuration and operational information for a plurality of services leased to the enterprise network, where the server device is not in the enterprise network; receive, from the server device, the configuration and operational information for the plurality of services; and store the configuration and operational information for the plurality of services in a second set of tables of the database, where the first set of tables and the second set of tables have tables in common that store at least part of the configuration and operational information for the plurality of virtual machines and the plurality of services.

A second example embodiment may involve transmitting, by a computing system, first instructions to a proxy server device of an enterprise network. Reception of the first instructions may cause the proxy server device to obtain, from a virtual machine manager device of the enterprise network, configuration and operational information for a plurality of virtual machines managed by the virtual machine manager device. The second example embodiment may also involve receiving, by the computing system and from the proxy server device, the configuration and operational information for the plurality of virtual machines. The second example embodiment may also involve storing, by the computing system, the configuration and operational information for the plurality of virtual machines in a first set of tables of a database. The second example embodiment may also involve transmitting, by the computing system, second instructions to a server device. Reception of the second instructions may cause the server device to obtain configuration and operational information for a plurality of services leased to the enterprise network, where the server device is not in the enterprise network. The second example embodiment may also involve receiving, by the computing system and from the server device, the configuration and operational information for the plurality of services. The second example embodiment may also involve storing, by the computing system, the configuration and operational information for the plurality of services in a second set of tables of the database, where the first set of tables and the second set of tables have tables in common that store at least part of the configuration and operational information for the plurality of virtual machines and the plurality of services.

In a third example embodiment, an article of manufacture may include a non-transitory computer-readable medium, having stored thereon program instructions that, upon execution by a computing system, cause the computing system to perform operations in accordance with the first and/or second example embodiment.

In a fourth example embodiment, a computing system may include at least one processor, as well as memory and program instructions. The program instructions may be stored in the memory, and upon execution by the at least one processor, cause the computing system to perform operations in accordance with the first and/or second example embodiment.

In a fifth example embodiment, a system may include various means for carrying out each of the operations of the first and/or second example embodiment.

These as well as other embodiments, aspects, advantages, and alternatives will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

DETAILED DESCRIPTION

Figure 1:
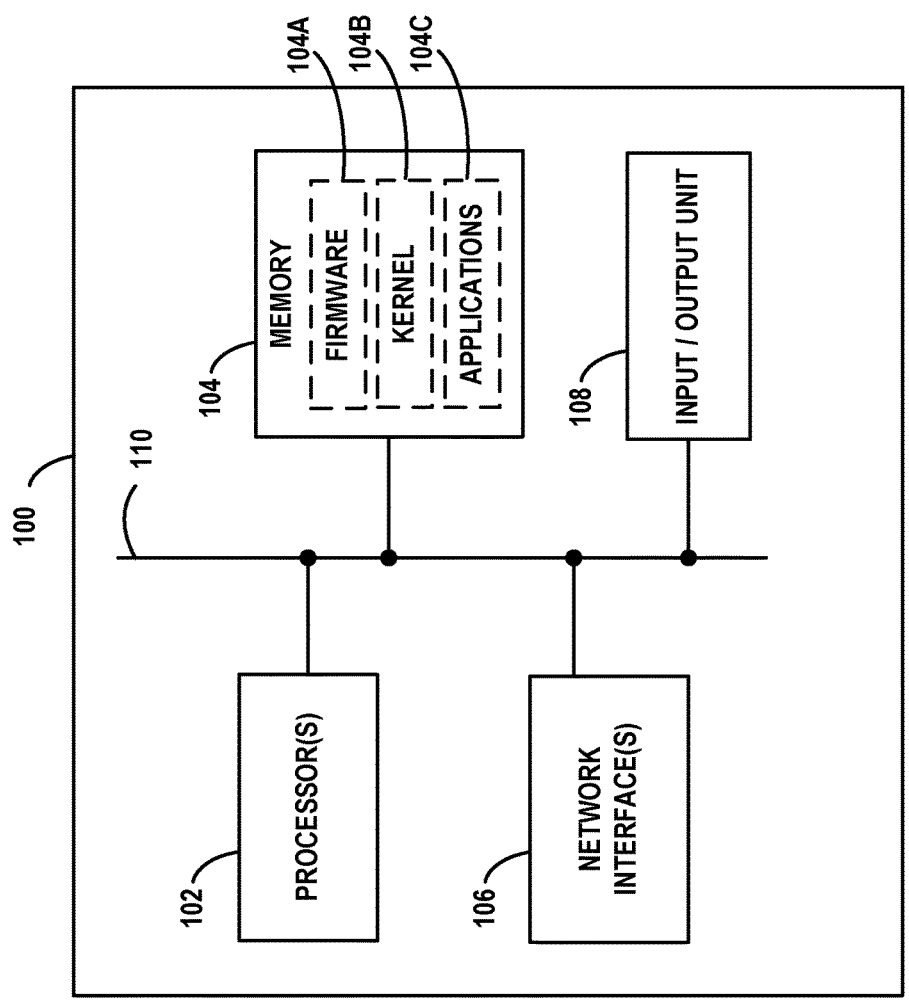
FIG. 1 illustrates a schematic drawing of a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. Introduction

A large enterprise is a complex entity with many interrelated operations. Some of these are found across the enterprise, such as human resources (HR), supply chain, information technology (IT), and finance. However, each enterprise also has its own unique operations that provide essential capabilities and/or create competitive advantages.

To support widely-implemented operations, enterprises typically use off-the-shelf software applications, such as customer relationship management (CRM) and human capital management (HCM) packages. However, they may also need custom software applications to meet their own unique requirements. A large enterprise often has dozens or hundreds of these custom software applications. Nonetheless, the advantages provided by the embodiments herein are not limited to large enterprises and may be applicable to an enterprise, or any other type of organization, of any size.

Many such software applications are developed by individual departments within the enterprise. These range from simple spreadsheets to custom-built software tools and databases. But the proliferation of siloed custom software applications has numerous disadvantages. It negatively impacts an enterprise's ability to run and grow its business, innovate, and meet regulatory requirements. The enterprise may find it difficult to integrate, streamline and enhance its operations due to lack of a single system that unifies its subsystems and data.

To efficiently create custom applications, enterprises would benefit from a remotely-hosted application platform that eliminates unnecessary development complexity. The goal of such a platform would be to reduce time-consuming, repetitive application development tasks so that software engineers and individuals in other roles can focus on developing unique, high-value features.

In order to achieve this goal, the concept of Application Platform as a Service (aPaaS) is introduced, to intelligently automate workflows throughout the enterprise. An aPaaS system is hosted remotely from the enterprise, but may access data and services within the enterprise by way of secure connections. Such an aPaaS system may have a number of advantageous capabilities and characteristics. These advantages and characteristics may be able to improve the enterprise's operations and workflow for IT, HR, CRM, customer service, application development, and security.

The aPaaS system may support development and execution of model-view-controller (MVC) applications. MVC applications divide their functionality into three interconnected parts (model, view, and controller) in order to isolate representations of information from the manner in which the information is presented to the user, thereby allowing for efficient code reuse and parallel development. These applications may be web-based, and offer create, read, update, delete (CRUD) capabilities. This allows new applications to be built on a common application infrastructure.

The aPaaS system may support standardized application components, such as a standardized set of widgets for graphical user interface (GUI) development. In this way, applications built using the aPaaS system have a common look and feel. Other software components and modules may be standardized as well. In some cases, this look and feel can be branded or skinned with an enterprise's custom logos and/or color schemes.

The aPaaS system may support the ability to configure the behavior of applications using metadata. This allows application behaviors to be rapidly adapted to meet specific needs. Such an approach reduces development time and increases flexibility. Further, the aPaaS system may support GUI tools that facilitate metadata creation and management, thus reducing errors in the metadata.

The aPaaS system may support clearly-defined interfaces between applications, so that software developers can avoid unwanted inter-application dependencies. Thus, the aPaaS system may implement a service layer in which persistent state information and other data is stored.

The aPaaS system may support a rich set of integration features so that the applications thereon can interact with legacy applications and third-party applications. For instance, the aPaaS system may support a custom employee-onboarding system that integrates with legacy HR, IT, and accounting systems.

The aPaaS system may support enterprise-grade security. Furthermore, since the aPaaS system may be remotely hosted, it should also utilize security procedures when it interacts with systems in the enterprise or third-party networks and services hosted outside of the enterprise. For example, the aPaaS system may be configured to share data amongst the enterprise and other parties to detect and identify common security threats.

Other features, functionality, and advantages of an aPaaS system may exist. This description is for purpose of example and is not intended to be limiting.

As an example of the aPaaS development process, a software developer may be tasked to create a new application using the aPaaS system. First, the developer may define the data model, which specifies the types of data that the application uses and the relationships therebetween. Then, via a GUI of the aPaaS system, the developer enters (e.g., uploads) the data model. The aPaaS system automatically creates all of the corresponding database tables, fields, and relationships, which can then be accessed via an object-oriented services layer.

In addition, the aPaaS system can also build a fully-functional MVC application with client-side interfaces and server-side CRUD logic. This generated application may serve as the basis of further development for the user. Advantageously, the developer does not have to spend a large amount of time on basic application functionality. Further, since the application may be web-based, it can be accessed from any Internet-enabled client device. Alternatively or additionally, a local copy of the application may be able to be accessed, for instance, when Internet service is not available.

The aPaaS system may also support a rich set of pre-defined functionality that can be added to applications. These features include support for searching, email, templating, workflow design, reporting, analytics, social media, scripting, mobile-friendly output, and customized GUIs.

The following embodiments describe architectural and functional aspects of example aPaaS systems, as well as the features and advantages thereof.

II. Example Computing Devices and Cloud-Based Computing Environments

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations.

In this example, computing device 100 includes processor(s) 102 (referred to as "processor 102" for sake of simplicity), memory 104, network interface(s) 106, and an input/output unit 108, all of which may be coupled by a system bus 110 or a similar mechanism. In some embodiments, computing device 100 may include other components and/or peripheral devices (e.g., detachable storage, printers, and so on).

Processor 102 may be any type of computer processing unit, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be a single-core processor, and in other cases, processor 102 may be a multi-core processor with multiple independent processing units. Processor 102 may also include register memory for temporarily storing instructions being executed and related data, as well as cache memory for temporarily storing recently-used instructions and data.

Memory 104 may be any form of computer-usable memory, including but not limited to register memory and cache memory (which may be incorporated into processor 102), as well as random access memory (RAM), read-only memory (ROM), and non-volatile memory (e.g., flash memory, hard disk drives, solid state drives, compact discs (CDs), digital video discs (DVDs), and/or tape storage). Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling and management of processes, input/output, and communication. Kernel 104B may also include device drivers that allow the operating system to communicate with the hardware modules (e.g., memory units, networking interfaces, ports, and busses), of computing device 100. Applications 104C may be one or more userspace software programs, such as web browsers or email clients, as well as any software libraries used by these programs.

Network interface(s) 106 may take the form of a wireline interface, such as Ethernet (e.g., Fast Ethernet, Gigabit Ethernet, and so on). Network interface(s) 106 may also support communication over non-Ethernet media, such as coaxial cables or power lines, or over wide-area media, such as Synchronous Optical Networking (SONET) or digital subscriber line (DSL) technologies. Network interface(s) 106 may also take the form of a wireless interface, such as IEEE 802.11 (Wifi), BLUETOOTH®, global positioning system (GPS), or a wide-area wireless interface. However, other forms of physical layer interfaces and other types of standard or proprietary communication protocols may be used over network interface(s) 106. Furthermore, network interface(s) 106 may comprise multiple physical interfaces. For instance, some embodiments of computing device 100 may include Ethernet, BLUETOOTH®, and Wifi interfaces.

Input/output unit 108 may facilitate user and peripheral device interaction with example computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more instances of computing device 100 may be deployed to support an aPaaS architecture. The exact physical location, connectivity, and configuration of these computing devices may be unknown and/or unimportant to client devices. Accordingly, the computing devices may be referred to as "cloud-based" devices that may be housed at various remote data center locations.

Figure 2:
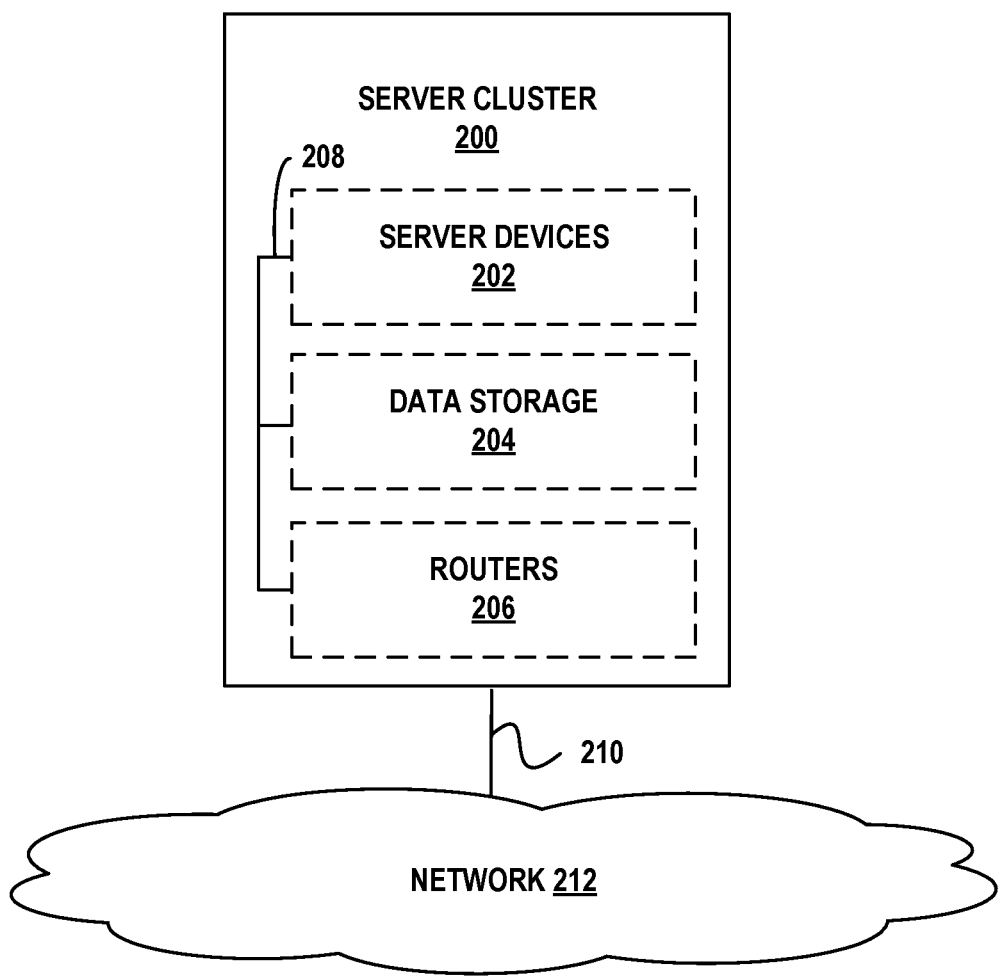
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purpose of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include array controllers configured to manage read and write access to groups of hard disk drives and/or solid state drives. The array controllers, alone or in conjunction with server devices 202, may also be configured to manage backup or redundant copies of the data stored in data storage 204 to protect against drive failures or other types of failures that prevent one or more of server devices 202 from accessing units of cluster data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via cluster network 208, and/or (ii) network communications between the server cluster 200 and other devices via communication link 210 to network 212.

Additionally, the configuration of cluster routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from cluster data storage 204. This transmission and retrieval may take the form of SQL queries or other types of database queries, and the output of such queries, respectively. Additional text, images, video, and/or audio may be included as well. Furthermore, server devices 202 may organize the received data into web page representations. Such a representation may take the form of a markup language, such as the hypertext markup language (HTML), the extensible markup language (XML), or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JavaScript, and so on. Computer program code written in these languages may facilitate the providing of web pages to client devices, as well as client device interaction with the web pages.

III. Example Remote Network Management Architecture

Figure 3:
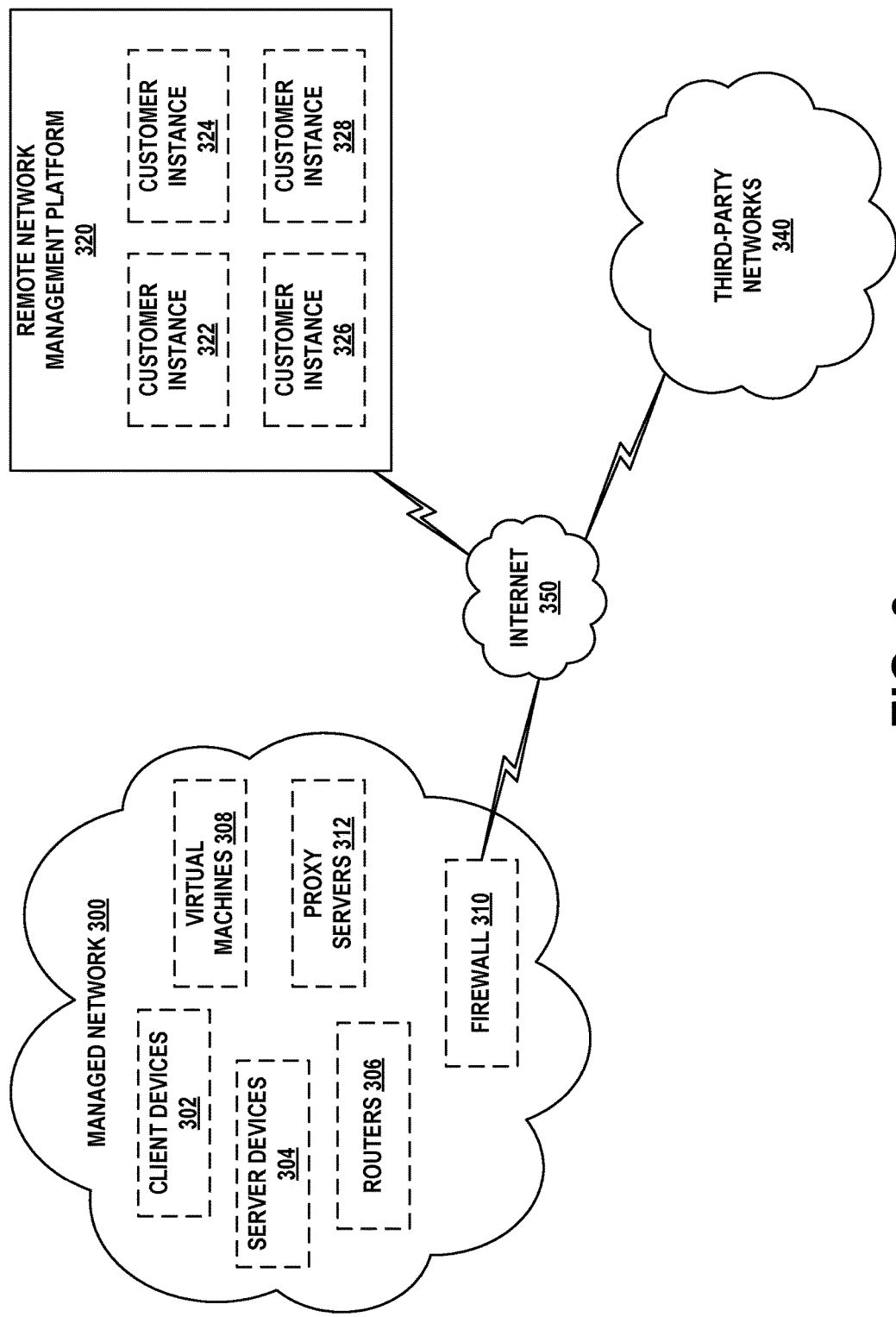
FIG. 3 depicts a remote network management architecture, in accordance with example embodiments.

FIG. 3 depicts a remote network management architecture, in accordance with example embodiments. This architecture includes three main components, managed network 300, remote network management platform 320, and third-party networks 340, all connected by way of Internet 350.

Managed network 300 may be, for example, an enterprise network used by a business for computing and communications tasks, as well as storage of data. Thus, managed network 300 may include various client devices 302, server devices 304, routers 306, virtual machines 308, firewall 310, and/or proxy servers 312. Client devices 302 may be embodied by computing device 100, server devices 304 may be embodied by computing device 100 or server cluster 200, and routers 306 may be any type of router, switch, or gateway.

Virtual machines 308 may be embodied by one or more of computing device 100 or server cluster 200. In general, a virtual machine is an emulation of a computing system, and mimics the functionality (e.g., processor, memory, and communication resources) of a physical computer. One physical computing system, such as server cluster 200, may support up to thousands of individual virtual machines. In some embodiments, virtual machines 308 may be managed by a centralized server device or application that facilitates allocation of physical computing resources to individual virtual machines, as well as performance and error reporting. Enterprises often employ virtual machines in order to allocate computing resources in an efficient, as needed fashion. Providers of virtualized computing systems include VMWARE® and MICROSOFT®.

Firewall 310 may be one or more specialized routers or server devices that protect managed network 300 from unauthorized attempts to access the devices and services therein, while allowing authorized communication that is initiated from managed network 300. Firewall 310 may also provide intrusion detection, web filtering, virus scanning, application-layer gateways, and other services. In some embodiments not shown in FIG. 3, managed network 300 may include one or more virtual private network (VPN) gateways with which it communicates with remote network management platform 320 (see below).

Managed network 300 may also include one or more proxy servers 312. An embodiment of proxy servers 312 may be a server device that facilitates communication and movement of data between managed network 300, remote network management platform 320, and third-party networks 340. In particular, proxy servers 312 may be able to establish and maintain secure communication sessions with one or more customer instances of remote network management platform 320. By way of such a session, remote network management platform 320 may be able to discover and manage aspects of the architecture and configuration of managed network 300 and its components. Possibly with the assistance of proxy servers 312, remote network management platform 320 may also be able to discover and manage aspects of third-party networks 340 that are used by managed network 300.

Firewalls, such as firewall 310, typically deny all communication sessions that are incoming by way of Internet 350, unless such a session was ultimately initiated from behind the firewall (i.e., from a device on managed network 300) or the firewall has been explicitly configured to support the session. By placing proxy servers 312 behind firewall 310 (e.g., within managed network 300 and protected by firewall 310), proxy servers 312 may be able to initiate these communication sessions through firewall 310. Thus, firewall 310 might not have to be specifically configured to support incoming sessions from remote network management platform 320, thereby avoiding potential security risks to managed network 300.

In some cases, managed network 300 may consist of a few devices and a small number of networks. In other deployments, managed network 300 may span multiple physical locations and include hundreds of networks and hundreds of thousands of devices. Thus, the architecture depicted in FIG. 3 is capable of scaling up or down by orders of magnitude.

Furthermore, depending on the size, architecture, and connectivity of managed network 300, a varying number of proxy servers 312 may be deployed therein. For example, each one of proxy servers 312 may be responsible for communicating with remote network management platform 320 regarding a portion of managed network 300. Alternatively or additionally, sets of two or more proxy servers may be assigned to such a portion of managed network 300 for purposes of load balancing, redundancy, and/or high availability.

Remote network management platform 320 is a hosted environment that provides aPaaS services to users, particularly to the operators of managed network 300. These services may take the form of web-based portals, for instance. Thus, a user can securely access remote network management platform 320 from, for instance, client devices 302, or potentially from a client device outside of managed network 300. By way of the web-based portals, users may design, test, and deploy applications, generate reports, view analytics, and perform other tasks.

As shown in FIG. 3, remote network management platform 320 includes four customer instances 322, 324, 326, and 328. Each of these instances may represent a set of web portals, services, and applications (e.g., a wholly-functioning aPaaS system) available to a particular customer. In some cases, a single customer may use multiple customer instances. For example, managed network 300 may be an enterprise customer of remote network management platform 320, and may use customer instances 322, 324, and 326. The reason for providing multiple instances to one customer is that the customer may wish to independently develop, test, and deploy its applications and services. Thus, customer instance 322 may be dedicated to application development related to managed network 300, customer instance 324 may be dedicated to testing these applications, and customer instance 326 may be dedicated to the live operation of tested applications and services.

The multi-instance architecture of remote network management platform 320 is in contrast to conventional multi-tenant architectures, over which multi-instance architectures have several advantages. In multi-tenant architectures, data from different customers (e.g., enterprises) are commingled in a single database. While these customers' data are separate from one another, the separation is enforced by the software that operates the single database. As a consequence, a security breach in this system may impact all customers' data, creating additional risk, especially for entities subject to governmental, healthcare, and/or financial regulation. Furthermore, any database operations that impact one customer will likely impact all customers sharing that database. Thus, if there is an outage due to hardware or software errors, this outage affects all such customers. Likewise, if the database is to be upgraded to meet the needs of one customer, it will be unavailable to all customers during the upgrade process. Often, such maintenance windows will be long, due to the size of the shared database In contrast, the multi-instance architecture provides each customer with its own database in a dedicated computing instance. This prevents commingling of customer data, and allows each instance to be independently managed. For example, when one customer's instance experiences an outage due to errors or an upgrade, other customer instances are not impacted. Maintenance down time is limited because the database only contains one customer's data. Further, the simpler design of the multi-instance architecture allows redundant copies of each customer database and instance to be deployed in a geographically diverse fashion. This facilitates high availability, where the live version of the customer's instance can be moved when faults are detected or maintenance is being performed.

In order to support multiple customer instances in an efficient fashion, remote network management platform 320 may implement a plurality of these instances on a single hardware platform. For example, when the aPaaS system is implemented on a server cluster such as server cluster 200, it may operate a virtual machine that dedicates varying amounts of computational, storage, and communication resources to instances. But full virtualization of server cluster 200 might not be necessary, and other mechanisms may be used to separate instances. In some examples, each instance may have a dedicated account and one or more dedicated databases on server cluster 200. Alternatively, customer instance 322 may span multiple physical devices.

In some cases, a single server cluster of remote network management platform 320 may support multiple independent enterprises. Furthermore, as described below, remote network management platform 320 may include multiple server clusters deployed in geographically diverse data centers in order to facilitate load balancing, redundancy, and/or high availability.

Third-party networks 340 may be remote server devices (e.g., a plurality of server clusters such as server cluster 200) that can be used for outsourced computational, data storage, communication, and service hosting operations. These servers may be virtualized (i.e., the servers may be virtual machines). Examples of third-party networks 340 may include AMAZON WEB SERVICES® and MICROSOFT® Azure. Like remote network management platform 320, multiple server clusters supporting third-party networks 340 may be deployed at geographically diverse locations for purposes of load balancing, redundancy, and/or high availability.

Managed network 300 may use one or more of third-party networks 340 to deploy services to its clients and customers. For instance, if managed network 300 provides online music streaming services, third-party networks 340 may store the music files and provide web interface and streaming capabilities. In this way, the enterprise of managed network 300 does not have to build and maintain its own servers for these operations.

Remote network management platform 320 may include modules that integrate with third-party networks 340 to expose virtual machines and managed services therein to managed network 300. The modules may allow users to request virtual resources and provide flexible reporting for third-party networks 340. In order to establish this functionality, a user from managed network 300 might first establish an account with third-party networks 340, and request a set of associated resources. Then, the user may enter the account information into the appropriate modules of remote network management platform 320. These modules may then automatically discover the manageable resources in the account, and also provide reports related to usage, performance, and billing.

Internet 350 may represent a portion of the global Internet. However, Internet 350 may alternatively represent a different type of network, such as a private wide-area or local-area packet-switched network.

Figure 4:
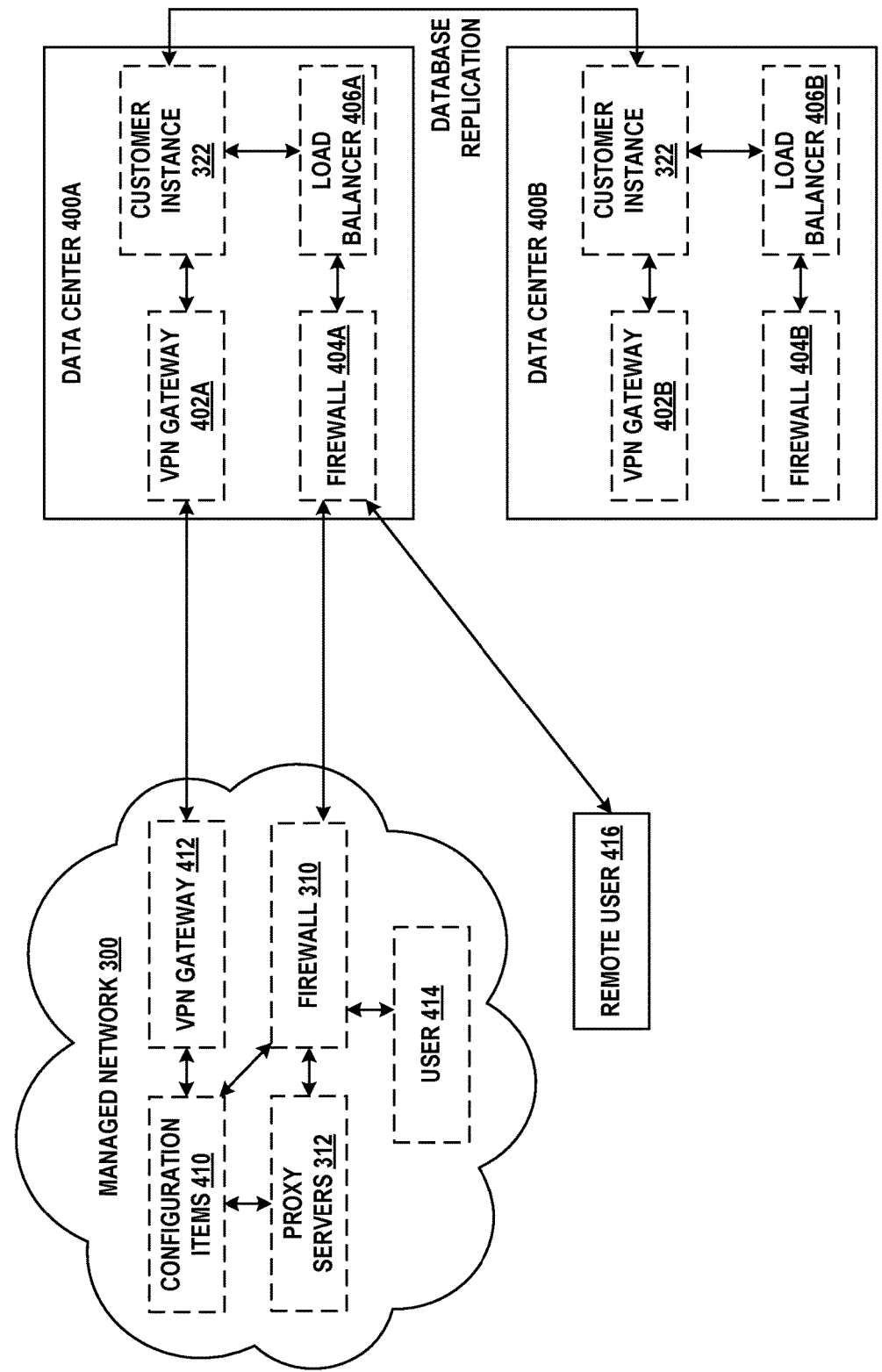
FIG. 4 depicts a communication environment involving a remote network management architecture, in accordance with example embodiments.

FIG. 4 further illustrates the communication environment between managed network 300 and customer instance 322, and introduces additional features and alternative embodiments. In FIG. 4, customer instance 322 is replicated across data centers 400A and 400B. These data centers may be geographically distant from one another, perhaps in different cities or different countries. Each data center includes support equipment that facilitates communication with managed network 300, as well as remote users.

In data center 400A, network traffic to and from external devices flows either through VPN gateway 402A or firewall 404A. VPN gateway 402A may be peered with VPN gateway 412 of managed network 300 by way of a security protocol such as Internet Protocol Security (IPSEC). Firewall 404A may be configured to allow access from authorized users, such as user 414 and remote user 416, and to deny access to unauthorized users. By way of firewall 404A, these users may access customer instance 322, and possibly other customer instances. Load balancer 406A may be used to distribute traffic amongst one or more physical or virtual server devices that host customer instance 322. Load balancer 406A may simplify user access by hiding the internal configuration of data center 400A, (e.g., customer instance 322) from client devices. For instance, if customer instance 322 includes multiple physical or virtual computing devices that share access to multiple databases, load balancer 406A may distribute network traffic and processing tasks across these computing devices and databases so that no one computing device or database is significantly busier than the others. In some embodiments, customer instance 322 may include VPN gateway 402A, firewall 404A, and load balancer 406A.

Data center 400B may include its own versions of the components in data center 400A. Thus, VPN gateway 402B, firewall 404B, and load balancer 406B may perform the same or similar operations as VPN gateway 402A, firewall 404A, and load balancer 406A, respectively. Further, by way of real-time or near-real-time database replication and/or other operations, customer instance 322 may exist simultaneously in data centers 400A and 400B.

Data centers 400A and 400B as shown in FIG. 4 may facilitate redundancy and high availability. In the configuration of FIG. 4, data center 400A is active and data center 400B is passive. Thus, data center 400A is serving all traffic to and from managed network 300, while the version of customer instance 322 in data center 400B is being updated in near-real-time. Other configurations, such as one in which both data centers are active, may be supported.

Should data center 400A fail in some fashion or otherwise become unavailable to users, data center 400B can take over as the active data center. For example, domain name system (DNS) servers that associate a domain name of customer instance 322 with one or more Internet Protocol (IP) addresses of data center 400A may re-associate the domain name with one or more IP addresses of data center 400B. After this re-association completes (which may take less than one second or several seconds), users may access customer instance 322 by way of data center 400B.

FIG. 4 also illustrates a possible configuration of managed network 300. As noted above, proxy servers 312 and user 414 may access customer instance 322 through firewall 310. Proxy servers 312 may also access configuration items 410. In FIG. 4, configuration items 410 may refer to any or all of client devices 302, server devices 304, routers 306, and virtual machines 308, any applications, programs, or services executing thereon, as well as relationships between devices and services. Thus, the term "configuration items" may be shorthand for any physical or virtual device or service remotely discoverable or managed by customer instance 322, or relationships between discovered devices and services. Configuration items may be represented in a configuration management database (CMDB) of customer instance 322.

As noted above, VPN gateway 412 may provide a dedicated VPN to VPN gateway 402A. Such a VPN may be helpful when there is a significant amount of traffic between managed network 300 and customer instance 322, or security policies otherwise suggest or require use of a VPN between these sites. In some embodiments, any device in managed network 300 and/or customer instance 322 that directly communicates via the VPN is assigned a public IP address. Other devices in managed network 300 and/or customer instance 322 may be assigned private IP addresses (e.g., IP addresses selected from the 10.0.0.0-10.255.255.255 or 192.168.0.0-192.168.255.255 ranges, represented in shorthand as subnets 10.0.0.0/8 and 192.168.0.0/16, respectively).

IV. Example Device and Service Discovery

In order for remote network management platform 320 to administer the devices and services of managed network 300, remote network management platform 320 may first determine what devices are present in managed network 300, the configurations and operational statuses of these devices, and the services provided by the devices, and well as the relationships between discovered devices and services. As noted above, each device, service, and relationship may be referred to as a configuration item. The process of defining configuration items within managed network 300 is referred to as discovery, and may be facilitated at least in part by proxy servers 312.

For purpose of the embodiments herein, a "service" may refer to a process, thread, application, program, server, or any other software that executes on a device. A "service" may also refer to a high-level capability provided by multiple processes, threads, applications, programs, and/or servers on one or more devices working in conjunction with one another. For example, a high-level web service may involve multiple web application server threads executing on one device and accessing information from a database service that executes on another device. The distinction between different types or levels of services may depend upon the context in which they are presented.

Figure 5A:
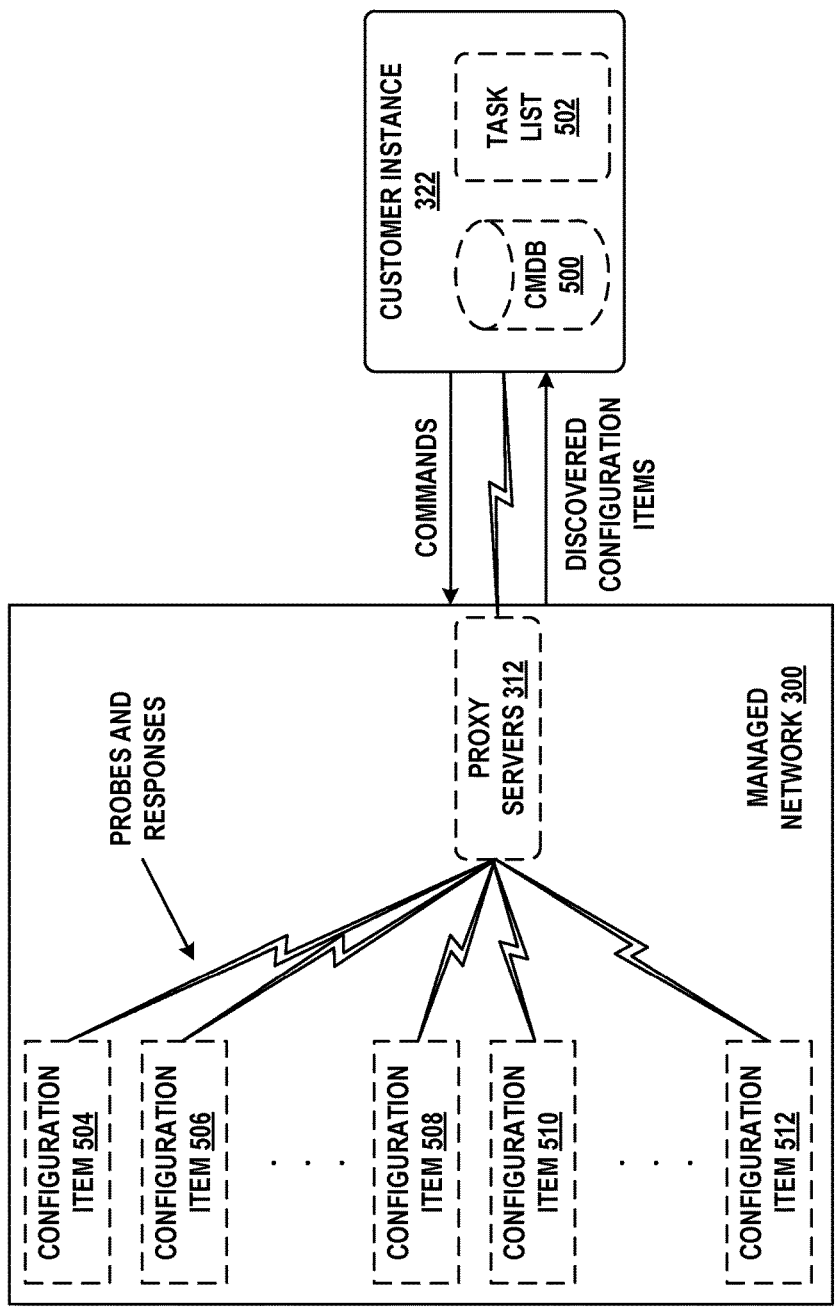
FIG. 5A depicts another communication environment involving a remote network management architecture, in accordance with example embodiments.

FIG. 5A provides a logical depiction of how configuration items can be discovered, as well as how information related to discovered configuration items can be stored. For sake of simplicity, remote network management platform 320, third-party networks 340, and Internet 350 are not shown.

In FIG. 5A, CMDB 500 and task list 502 are stored within customer instance 322. Customer instance 322 may transmit discovery commands to proxy servers 312. In response, proxy servers 312 may transmit probes to various devices and services in managed network 300. These devices and services may transmit responses to proxy servers 312, and proxy servers 312 may then provide information regarding discovered configuration items to CMDB 500 for storage therein. Configuration items stored in CMDB 500 represent the environment of managed network 300.

Task list 502 represents a list of activities that proxy servers 312 are to perform on behalf of customer instance 322. As discovery takes place, task list 502 is populated. Proxy servers 312 repeatedly query task list 502, obtain the next task therein, and perform this task until task list 502 is empty or another stopping condition has been reached.

To facilitate discovery, proxy servers 312 may be configured with information regarding one or more subnets in managed network 300 that are reachable by way of proxy servers 312. For instance, proxy servers 312 may be given the IP address range 192.168.0/24 as a subnet. Then, customer instance 322 may store this information in CMDB 500 and place tasks in task list 502 for discovery of devices at each of these addresses.

FIG. 5A also depicts devices and services in managed network 300 as configuration items 504, 506, 508, 510, and 512. As noted above, these configuration items represent a set of physical and/or virtual devices (e.g., client devices, server devices, routers, or virtual machines), services executing thereon (e.g., web servers, email servers, databases, or storage arrays), relationships therebetween, as well as higher-level services that involve multiple individual configuration items.

Placing the tasks in task list 502 may trigger or otherwise cause proxy servers 312 to begin discovery. Alternatively or additionally, discovery may be manually triggered or automatically triggered based on triggering events (e.g., discovery may automatically begin once per day at a particular time).

In general, discovery may proceed in four logical phases: scanning, classification, identification, and exploration. Each phase of discovery involves various types of probe messages being transmitted by proxy servers 312 to one or more devices in managed network 300. The responses to these probes may be received and processed by proxy servers 312, and representations thereof may be transmitted to CMDB 500. Thus, each phase can result in more configuration items being discovered and stored in CMDB 500.

In the scanning phase, proxy servers 312 may probe each IP address in the specified range of IP addresses for open Transmission Control Protocol (TCP) and/or User Datagram Protocol (UDP) ports to determine the general type of device. The presence of such open ports at an IP address may indicate that a particular application is operating on the device that is assigned the IP address, which in turn may identify the operating system used by the device. For example, if TCP port 135 is open, then the device is likely executing a WINDOWS® operating system. Similarly, if TCP port 22 is open, then the device is likely executing a UNIX® operating system, such as LINUX®. If UDP port 161 is open, then the device may be able to be further identified through the Simple Network Management Protocol (SNMP). Other possibilities exist. Once the presence of a device at a particular IP address and its open ports have been discovered, these configuration items are saved in CMDB 500.

In the classification phase, proxy servers 312 may further probe each discovered device to determine the version of its operating system. The probes used for a particular device are based on information gathered about the devices during the scanning phase. For example, if a device is found with TCP port 22 open, a set of UNIX®-specific probes may be used. Likewise, if a device is found with TCP port 135 open, a set of WINDOWS®-specific probes may be used. For either case, an appropriate set of tasks may be placed in task list 502 for proxy servers 312 to carry out. These tasks may result in proxy servers 312 logging on, or otherwise accessing information from the particular device. For instance, if TCP port 22 is open, proxy servers 312 may be instructed to initiate a Secure Shell (SSH) connection to the particular device and obtain information about the operating system thereon from particular locations in the file system. Based on this information, the operating system may be determined. As an example, a UNIX® device with TCP port 22 open may be classified as AIX®, HPUX, LINUX®, MACOS®, or SOLARIS®. This classification information may be stored as one or more configuration items in CMDB 500.

In the identification phase, proxy servers 312 may determine specific details about a classified device. The probes used during this phase may be based on information gathered about the particular devices during the classification phase. For example, if a device was classified as LINUX®, as a set of LINUX®-specific probes may be used. Likewise if a device was classified as WINDOWS® 2012, as a set of WINDOWS®-2012-specific probes may be used. As was the case for the classification phase, an appropriate set of tasks may be placed in task list 502 for proxy servers 312 to carry out. These tasks may result in proxy servers 312 reading information from the particular device, such as basic input/output system (BIOS) information, serial numbers, network interface information, media access control address(es) assigned to these network interface(s), IP address(es) used by the particular device and so on. This identification information may be stored as one or more configuration items in CMDB 500.

In the exploration phase, proxy servers 312 may determine further details about the operational state of a classified device. The probes used during this phase may be based on information gathered about the particular devices during the classification phase and/or the identification phase. Again, an appropriate set of tasks may be placed in task list 502 for proxy servers 312 to carry out. These tasks may result in proxy servers 312 reading additional information from the particular device, such as processor information, memory information, lists of running processes (services), and so on. Once more, the discovered information may be stored as one or more configuration items in CMDB 500.

Running discovery on a network device, such as a router, may utilize SNMP. Instead of or in addition to determining a list of running processes or other application-related information, discovery may determine additional subnets known to the router and the operational state of the router's network interfaces (e.g., active, inactive, queue length, number of packets dropped, etc.). The IP addresses of the additional subnets may be candidates for further discovery procedures. Thus, discovery may progress iteratively or recursively.

Once discovery completes, a snapshot representation of each discovered device and service is available in CMDB 500. For example, after discovery, operating system version, hardware configuration and network configuration details for client devices, server devices, and routers in managed network 300, as well as services executing thereon, may be stored. This collected information may be presented to a user in various ways to allow the user to view the hardware composition and operational status of devices, as well as the characteristics of services.

Furthermore, CMDB 500 may include entries regarding dependencies and relationships between configuration items. More specifically, an application that is executing on a particular server device, as well as the services that rely on this application, may be represented as such in CMDB 500. For instance, suppose that a database application is executing on a server device, and that this database application is used by a new employee onboarding service as well as a payroll service. Thus, if the server device is taken out of operation for maintenance, it is clear that the employee onboarding service and payroll service will be impacted. Likewise, the dependencies and relationships between configuration items may be able to represent the services impacted when a particular router fails.

In general, dependencies and relationships between configuration items be displayed on a web-based interface and represented in a hierarchical fashion. Thus, adding, changing, or removing such dependencies and relationships may be accomplished by way of this interface.

Furthermore, users from managed network 300 may develop workflows that allow certain coordinated activities to take place across multiple discovered devices. For instance, an IT workflow might allow the user to change the common administrator password to all discovered LINUX® devices in single operation.

In order for discovery to take place in the manner described above, proxy servers 312, CMDB 500, and/or one or more credential stores may be configured with credentials for one or more of the devices to be discovered. Credentials may include any type of information needed in order to access the devices. These may include userid/password pairs, certificates, and so on. In some embodiments, these credentials may be stored in encrypted fields of CMDB 500. Proxy servers 312 may contain the decryption key for the credentials so that proxy servers 312 can use these credentials to log on to or otherwise access devices being discovered.

Figure 5B:
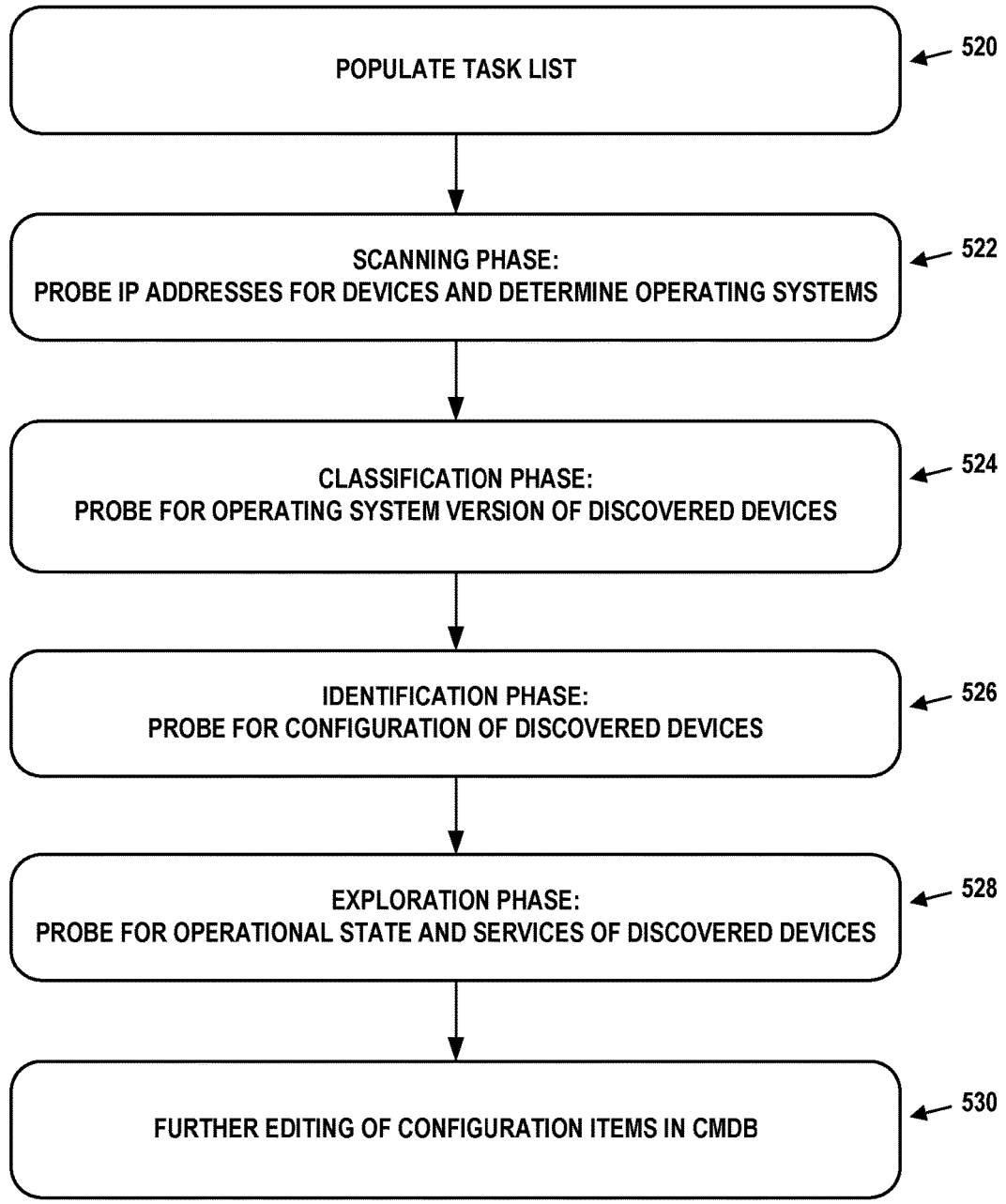
FIG. 5B is a flow chart, in accordance with example embodiments.

The discovery process is depicted as a flow chart in FIG. 5B. At block 520, the task list in the customer instance is populated, for instance, with a range of IP addresses. At block 522, the scanning phase takes place. Thus, the proxy servers probe the IP addresses for devices using these IP addresses and attempt to determine the operating systems that are executing on these devices. At block 524, the classification phase takes place. The proxy servers attempt to determine the operating system version of the discovered devices. At block 526, the identification phase takes place. The proxy servers attempt to determine the hardware and/or software configuration of the discovered devices. At block 528, the exploration phase takes place. The proxy servers attempt to determine the operational state and services executing on the discovered devices. At block 530, further editing of the configuration items representing the discovered devices and services may take place. This editing may be automated and/or manual in nature.

The blocks represented in FIG. 5B are for purpose of example. Discovery may be a highly configurable procedure that can have more or fewer phases, and the operations of each phase may vary. In some cases, one or more phases may be customized, or may otherwise deviate from the exemplary descriptions above.

V. Example Discovery of Virtual Machines and Cloud-based Networks

Figure 6A:
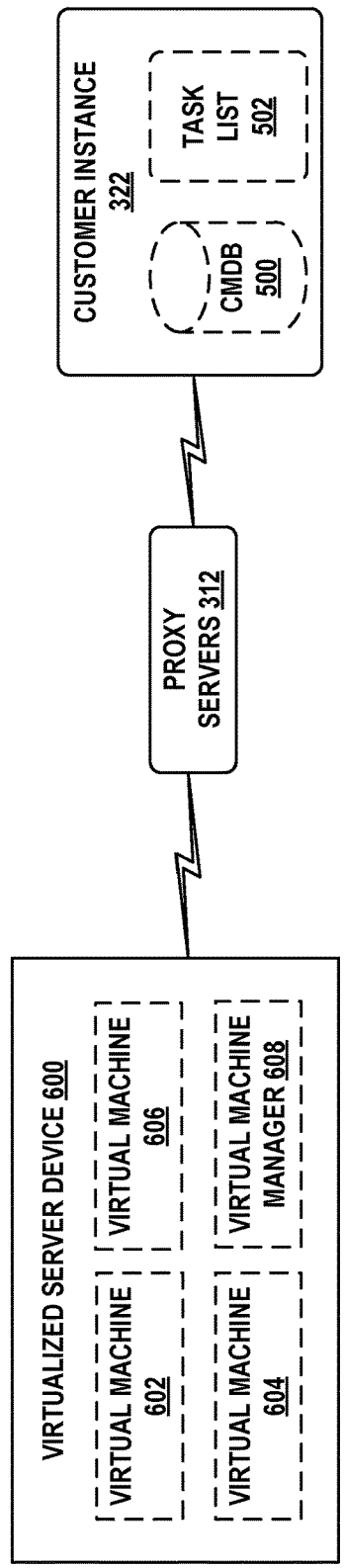
FIG. 6A depicts a communication environment involving remote management of a virtualized server device, in accordance with example embodiments.

Discovery for virtual machines may take place in a different fashion. FIG. 6A depicts a simplified network architecture similar to that of FIG. 5A. As such, CMDB 500 and task list 502 are stored within customer instance 322, and customer instance 322 communicates with devices on a managed network by way of proxy servers 312. For purpose of exposition, only one physical device from the managed network, server device 600, is shown in FIG. 6A.

Server device 600 includes three virtual machines 602, 604 and 606, as well as virtual machine manager 608. Virtual machine manager 608 may be accessed by way of a web interface or application programming interface (API). In some deployments, virtual machine manager 608 may operate on a different physical device from that of virtual machines 602, 604 and 606.

While each of virtual machines 602, 604 and 606 may be accessible by way of SSH or other remote access protocols or services, virtual machine manager 608 may provide an integrated interface to these components. For instance, by way of the web interface, virtual machine manager 608 may display information regarding the CPU, memory, disk space, and networking resources dedicated to each of virtual machines 602, 604 and 606, as well as the operating system and version thereof that these virtual machines are executing. Virtual machine manager 608 may also provide lists of applications or services executing on each of virtual machines 602, 604 and 606, as well as display any alarms or status updates related to these machines.

Since virtual machine manager 608 may be aware of the operational characteristics of virtual machines 602, 604 and 606, proxy servers 312 may be instructed to probe virtual machine manager 608 for this information rather than attempting to discover virtual machines 602, 604 and 606 individually. This probing may involve proxy servers 312 logging on to virtual machine manager 608 to obtain the information, or requesting and receiving the information by way of the APIs. Regardless, configuration and operational information of each virtual machine may be obtained in this fashion and stored in CMDB 500.

As noted above, enterprises and other types of entities that operate networks such as managed network 300, may also lease resources from third-party networks 340. Conventionally, such third-party resources are managed separately from the resources of the managed network (e.g., server device 600 and the virtualized components therein). For instance, third-party networks 340 may have their own respective web-based management interfaces and APIs that provide information regarding the configuration and operational status of computational resources leased by the managed network. Furthermore, different third-party networks 340 may offer different types of services in different ways from one another and from those of virtualized server devices in the managed network.

Figure 6B:
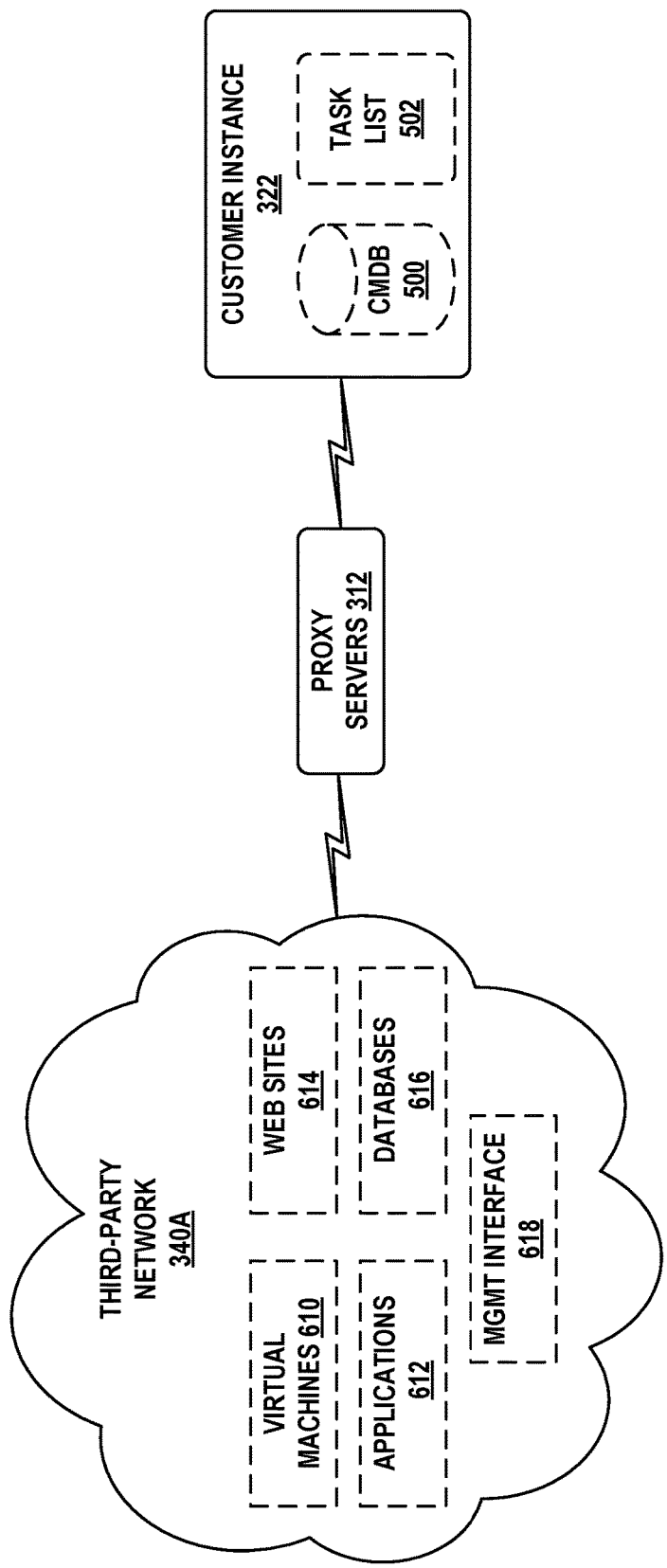
FIG. 6B depicts a communication environment involving remote management of a third-party network, in accordance with example embodiments.

FIG. 6B depicts a simplified network architecture similar to that of FIG. 6A, except that third-party network 340A is the resource being managed. Third-party network 340A may include one or more virtual machines 610, applications 612, web sites 614, databases 616, and/or management interfaces 618. Nonetheless, more or fewer devices and/or services may be hosted by third-party network 340A.

Virtual machines 610 may include CPU, memory, disk space, and networking resources arranged as one or more virtual devices. Each may be executing a different operating system. Applications 612 may be one or more web-based applications, mobile back-end applications, or other types of applications. Web sites 614 may be one or more remotely hosted web sites that are managed by way of third-party network 340A. Databases 616 may be one or more databases that store information. This information may be accessible to virtual machines 610, applications 612, and/or web sites 614, as well as other devices and services not hosted by third-party network 340A. Management interface 618 may include one or more web-based consoles and/or APIs through which the resources of third-party network 340A can be allocated, viewed, changed, monitored, and/or deallocated.

In order to perform discovery on third-party network 340A, account credentials rather than an IP address or subnet may be entered into CMDB 500. Then, customer instance 322, with or without the assistance of proxy servers 312, may access third-party network 340A (e.g., by way of the APIs of management interface 618) to discover the existence, configuration, and status of virtual machines 610, applications 612, web sites 614, and databases 616.

The separate management of third-party networks 340, however, leads to inefficiencies. First, each third-party network may be accessed by way of different management interfaces and APIs. Thus, supporting each type of third-party network and virtualized server device with a completely different data model (schema) in CMDB 500 is duplicative and inefficient. Second, any changes or enhancements to one of these different data models would likely have to eventually be implemented across the other data models, resulting in another duplication of effort. Third, it is difficult to represent relationships between configuration items across third-party networks and virtualized server devices hosted on the managed network when the resources of each are represented in different manners in the data models.

The embodiments herein are motivated in part by the observation that third-party networks and virtualized server devices hosted on the managed network can be viewed similarly in spite of their differences. For example, each third-party network may provide a management interface through which resources of the third-party network can be administered. Similarly, virtualized server devices may be administered by way of a virtual machine manager. Despite these similarities, the resources managed may be different across various third-party networks and virtualized server devices. Still, there may be enough commonality amongst these resources for CMDB 500 to be configured with a data model that supports these commonalities as well as the differences between third-party networks and virtualized server devices.

Another advantage to using this unified data model is that application software can access entities of a particular type from a single location in the data model, regardless of the type of third-party network or virtualized server devices to which the entity belongs. This results in simpler program logic with consistent behavior across third-party networks, and provides for easier extensibility.

Not only does such an arrangement result in a simpler, less duplicative data model that requires a smaller amount of storage space, but also allows users to more easily define relationships between configuration items when these configuration items span third-party networks and virtualized server devices, or span multiple third-party networks.

VI. Example Data Model

Figure 7:
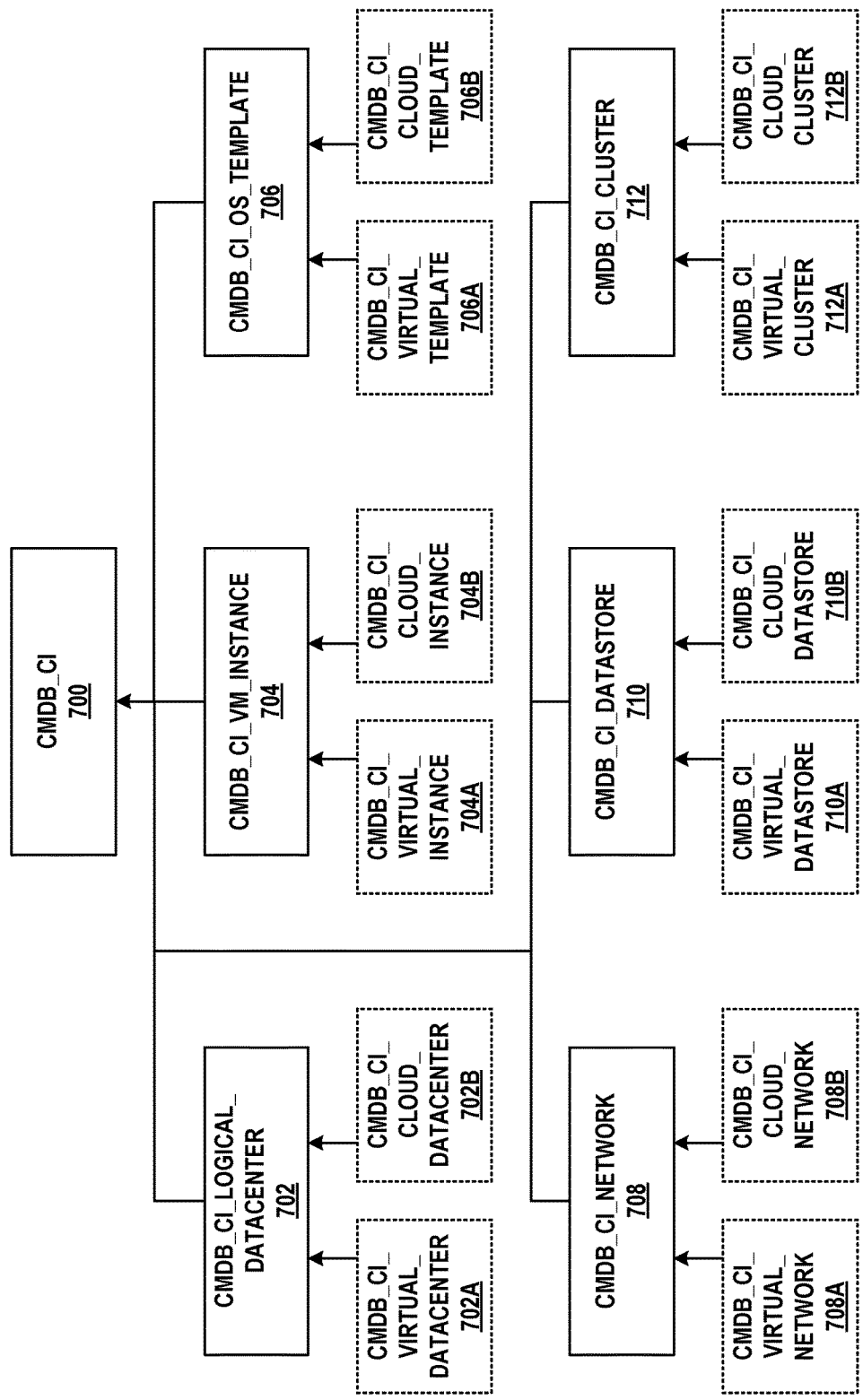
FIG. 7 depicts a data model, in accordance with example embodiments.

FIG. 7 is an example data model that supports devices in managed networks and third-party networks with a combination of shared and dedicated tables. While this data model reflects a particular structure and naming convention, other table structures and names could be used to support the embodiments herein.

The data model as depicted in FIG. 7 shows a number of tables and relationships therebetween. Each table may store a set of data values in specific named vertical columns and a flexible number of horizontal rows. A cell is where a row and column intersect, and stores such a data value.

Relationships between tables are indicated with arrows. For instance, tables 702, 704, 706, 708, 710, and 712 each store specific types of data, the definitions of which are derived in part from table 700. Thus, table 700 is a parent to tables 702, 704, 706, 708, 710, and 712. Similarly, table 702 is a parent to tables 702A and 702B, table 704 is a parent to tables 704A and 704B, and so on.

Tables 700, 702, 704, 706, 708, 710, and 712 are common tables used to store data related to, for example, virtualized server devices in both third-party networks and managed networks. These common tables are represented with solid borders. The remaining tables are specific to either third-party networks or managed networks, and are represented with dotted borders. Particularly, tables 702A, 704A, 706A, 708A, 710A, and 712A store data related to managed networks, and tables 702B, 704B, 706B, 708B, 710B, and 712B store data related to a particular third-party network.

Example content of each table is described below. This description might not be comprehensive—more or less data could be stored in any of these tables. Additionally, embodiments that support more than one type of third-party network may include tables for storing data related to an additional third-party network.

Table 700 stores data generally related to a configuration item, such as a computing device. Entries may include data related to how the configuration item was discovered, when it was discovered, its model number, its operational state, its IP address and medium-access control (MAC) address, its fully-qualified domain name, and so on.

Table 702 stores data generally related to data centers. Data centers refer to one or more physical and/or logical locations in which configuration items are disposed. For example, a physical location may include multiple physical or virtual data centers, and single data centers can be spread across multiple physical locations. Entries in table 702 may include data related to the region of the data center, its uniform resource locator (URL), and whether resources within the data center have been discovered. Tables 702A and 702B contain data further classifying managed network data centers and third-party network data centers, respectively. Each of these tables may contain different attributes specific to the type of data center. As an example, table 702A may contain entries related to URLs or directory information for virtual machines and/or hosts of one or more virtualized server devices at a managed network data center.

Table 704 stores data generally related to individual virtual machines. Entries may include data related the state of each virtual machine, as well as their CPUs, memory, disk space, and network interfaces. Tables 704A and 704B contain data further classifying virtual machines in a managed network and in a third-party network, respectively. As an example, table 704A may contain entries related to the configuration of the virtual hardware, as well as various identifiers of the virtual machine, its operating system, and its BIOS.

Table 706 stores data generally related to an operating system executable on a configuration item. Entries may include data related to a operating system template for a virtual machine—particularly, a configuration from which a virtual machine can be cloned. Tables 706A and 706B contain data related to virtualized server device operating systems of a managed network and a third-party network, respectively. As an example, table 706A may contain entries related to the specific configuration of an operating system for a managed network.

Table 708 stores data generally related to a virtual or physical network interface of a configuration item. Entries may include data related the netmask, broadcast address, and default gateway of the interface, as well as whether the Dynamic Host Configuration Protocol (DHCP) is operational for the interface, the maximum transmission unit (MTU) of the interface, and so on. Tables 708A and 708B contain data related to network interfaces of a virtualized server device in a managed network and a third-party network, respectively. As an example, table 708A may contain entries related to whether the network interface is accessible to virtual machines within the managed network.

Table 710 stores data generally related to a physical or logical data storage device (e.g., a disk drive or storage array). Entries may include data related to the total storage space provided, the unused space remaining, and a URL of the data storage device. Tables 710A and 710B contain data related to data storage devices of virtualized server devices in a managed network and in a third-party network, respectively. As an example, table 710A may contain entries related to whether the data storage device is connected to the managed network, the type of filesystem on the data storage device, and whether the data storage device is clustered (e.g., whether the data storage device includes multiple physical data storage devices).

Table 712 stores data generally related to a cluster of virtual machines. Entries may include data related to the number of CPUs, number of CPU cores, number of CPU threads, and the amount of memory of the cluster. Tables 712A and 712B contain data related to clusters of a managed network and of a third-party network, respectively. As an example, table 712A may contain entries related to specifying that the cluster is a cluster of virtual machines within a managed network.

VII. Example Operations

Figure 8:
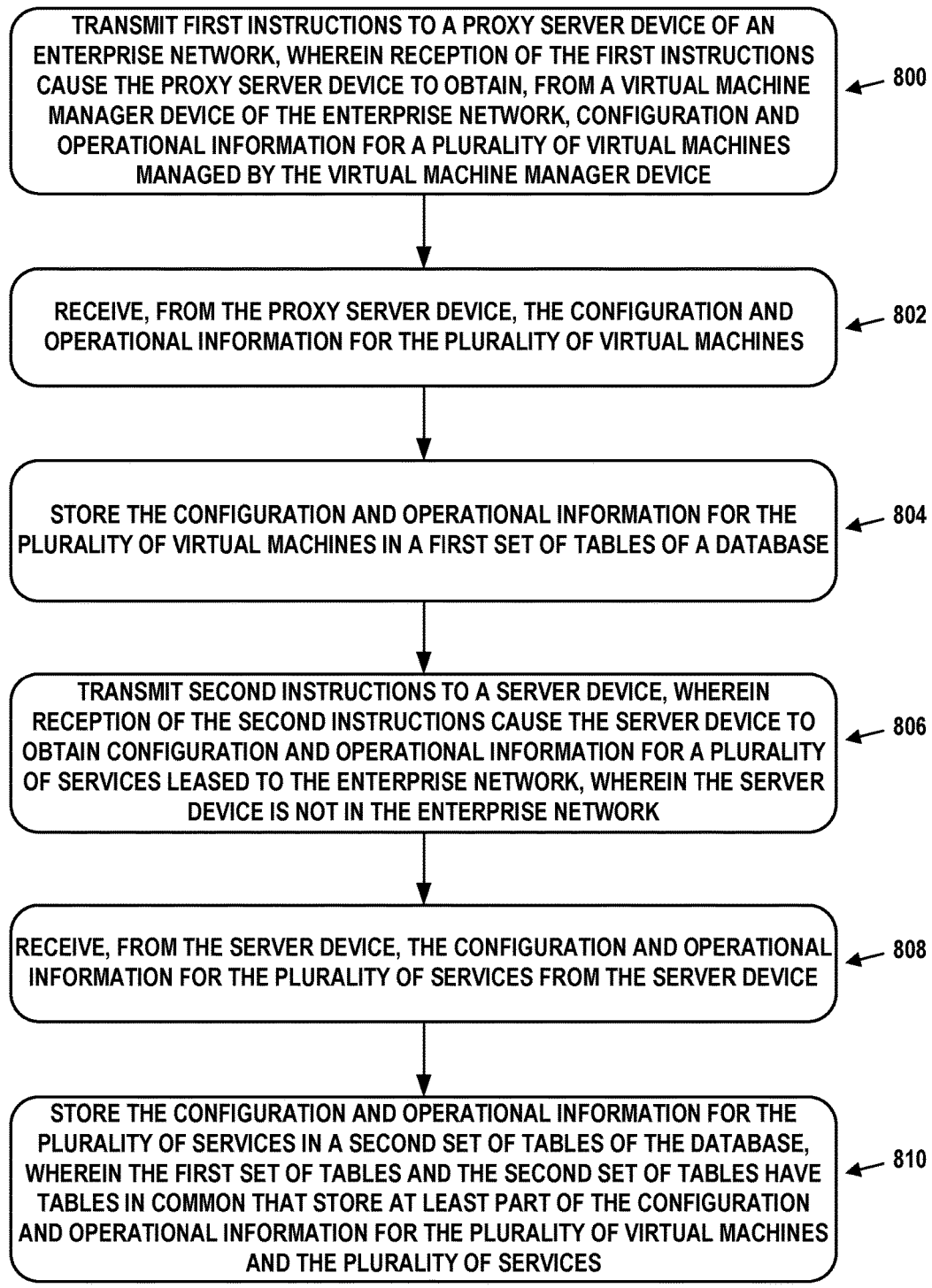
FIG. 8 is a flow chart, in accordance with example embodiments.

FIG. 8 is a flow chart illustrating an example embodiment. The process illustrated by FIG. 8 may be carried out by a computing device, such as computing device 100, and/or a cluster of computing devices, such as server cluster 200. However, the process can be carried out by other types of devices or device subsystems. For example, the process could be carried out by a portable computer, such as a laptop or a tablet device. As described above, the process may be carried out by a computing system within a customer instance of a remote network management platform, with assistance from a proxy server device operating within a customer network.

The embodiments of FIG. 8 may be simplified by the removal of any one or more of the features shown therein. Further, these embodiments may be combined with features, aspects, and/or implementations of any of the previous figures or as otherwise described herein.

Block 800 may involve transmitting, by a computing system, first instructions to a proxy server device of an enterprise network. Reception of the first instructions may cause the proxy server device to obtain, from a virtual machine manager device of the enterprise network, configuration and operational information for a plurality of virtual machines managed by the virtual machine manager device.

Block 802 may involve receiving, by the computing system and from the proxy server device, the configuration and operational information for the plurality of virtual machines.

Block 804 may involve storing, by the computing system, the configuration and operational information for the plurality of virtual machines in a first set of tables of a database.

Block 806 may involve transmitting, by the computing system, second instructions to a server device. Reception of the second instructions may cause the server device to obtain configuration and operational information for a plurality of services leased to the enterprise network. The server device might not be in the enterprise network.

Block 808 may involve receiving, by the computing system and from the server device, the configuration and operational information for the plurality of services.

Block 810 may involve storing, by the computing system, the configuration and operational information for the plurality of services in a second set of tables of the database. The first set of tables and the second set of tables may have tables in common that store at least part of the configuration and operational information for the plurality of virtual machines and the plurality of services.

In some embodiments, the tables in common may include entries for processor, memory, storage, or networking resources respectively available to the plurality of virtual machines and the plurality of services.

In some embodiments, each of the tables in common is a parent table to a respective pair of tables. Each respective pair of tables may include a first table storing configuration and operational information specific to the plurality of virtual machines managed by the virtual machine manager device. Each respective pair of tables may also include a second table storing configuration and operational information specific to the plurality of services leased to the enterprise network.

In some embodiments, the plurality of services may include one or more virtual machines, applications, web sites, or databases leased to the enterprise network.

In some embodiments, the plurality of services leased to the enterprise network may be operated by a third party that is neither the enterprise network nor the operator of the computing system. The plurality of services may be available in multiple physical data centers in different geographic locations.

In some embodiments, transmitting the second instructions to the server device may involve transmitting a representation of the second instructions to the proxy server device. Reception of the representation of the second instructions may cause the proxy server device to transmit the second instructions to the server device.

In some embodiments, obtaining configuration and operational information for the plurality of virtual machines managed by the virtual machine manager device occurs without the proxy server device communicating directly with any of the plurality of virtual machines.

In some embodiments, transmitting the second instructions to the server device comprises logging on to the server device using account credentials related to the enterprise network. The configuration and operational information for the plurality of services leased to the enterprise network may be obtained by way of APIs.

In some embodiments, the computing system may provide, to a client device, a graphical user interface representing data in the first set of tables and the second set of tables. The graphical user interface may allow the data to be modified. Modifying the data may involve defining relationships and dependencies between the plurality of virtual machines and the plurality of services.

VIII. Conclusion

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid state drive, or another storage medium.

The computer readable medium can also include non-transitory computer readable media such as computer readable media that store data for short periods of time like register memory and processor cache. The computer readable media can further include non-transitory computer readable media that store program code and/or data for longer periods of time. Thus, the computer readable media may include secondary or persistent long term storage, like ROM, optical or magnetic disks, compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A computer network discovery system comprising:
   a database disposed within a remote network management platform; and
   a computing system disposed within the remote network management platform, wherein the remote network management platform manages a managed network, and wherein the computing system is configured to:
      initiate a discovery scan of first and second server devices, wherein the first and second server devices are not in the managed network;
      receive first and second respective sets of configuration and operational information from the first and second respective server devices for first and second respective services provided to the managed network, wherein the first and second services are offered by different entities and have different configurations;
      store the first and second respective sets of configuration and operational information for the first and second respective services in the database; and
      provide a graphical user interface representing data corresponding to the first and second services.

2. The computer network discovery system of claim 1, wherein the computing system is configured to receive, via the graphical user interface, an input modifying the data.

3. The computer network discovery system of claim 2, wherein modifying the data comprises defining relationships between the first the service and the second service.

4. The computer network discovery system of claim 1, wherein the first set of configuration and operational information is stored in a first set of tables in the database, wherein the second set of configuration and operational information is stored in a second set of tables in the database, and wherein the first set of tables and the second set of tables have tables in common that store parts of both the first set of configuration and operational information and the second set of configuration and operational information.

5. The computer network discovery system of claim 4, wherein each of the tables in common is a parent table to a respective pair of tables, wherein each respective pair of tables comprises:
   a first table storing configuration and operational information specific to the first service; and
   a second table storing configuration and operational information specific to the second service.

6. The computer network discovery system of claim 1, wherein the first service includes one or more virtual machines, applications, web sites, or additional databases, or a combination thereof, leased to the managed network.

7. The computer network discovery system of claim 1, wherein the first service is operated by a first party that is neither an operator of the managed network nor an operator of the remote network management platform, and wherein the first service is available in multiple physical data centers in different geographic locations.

8. The computer network discovery system of claim 7, wherein the second service is operated by a second party that is neither an operator of the managed network nor an operator of the remote network management platform, and wherein the second service is available in multiple physical data centers in different geographic locations.

9. The computer network discovery system of claim 1, wherein initiating the discovery scan of the first and second server devices comprises transmitting a representation of first instructions to a proxy server application disposed within the managed network, and wherein reception of the representation of the first instructions causes the proxy server application to transmit the first instructions to the first server device.

10. The computer network discovery system of claim 1, wherein initiating the discovery scan of the first and second server devices comprises logging on to the first server device using account credentials related to the managed network, and wherein the first configuration and operational information for the first service is obtained by way of application programming interfaces.

11. A method comprising:
   initiating, by a computing device of a managed network, a discovery scan of first and second server devices, wherein the first and second server devices are not in the managed network;
   receiving, by the computing device, first and second respective sets of configuration and operational information from the first and second respective server devices for first and second respective services provided to the managed network, wherein the first and second services are offered by different entities and have different configurations;
   storing, by the computing device, the first and second respective sets of configuration and operational information for the first and second respective services in a database disposed within a remote network management platform; and
   providing, to a client device, a graphical user interface representing data corresponding to the first and second services.

12. The method of claim 11, wherein the first set of configuration and operational information is stored in a first set of tables in the database, wherein the second set of configuration and operational information is stored in a second set of tables in the database, and wherein the first set of tables and the second set of tables have tables in common that store parts of both the first set of configuration and operational information and the second set of configuration and operational information.

13. The method of claim 12, wherein the tables in common include entries for processor, memory, storage, or networking resources respectively available to the first and second respective services.

14. The method of claim 12, wherein each of the tables in common is a parent table to a respective pair of tables, wherein each respective pair of tables comprises:

a first table storing configuration and operational information specific to the first service; and a second table storing configuration and operational information specific to the second service.

15. The method of claim 11, wherein the first service includes one or more virtual machines, applications, web sites, or additional databases, or a combination thereof, leased to the managed network.

16. The method of claim 11, wherein the first service is operated by a first party that is neither an operator of the managed network nor an operator of the remote network management platform, and wherein the first service is available in multiple physical data centers in different geographic locations.

17. The method of claim 11, wherein initiating the discovery scan of the first and second server devices comprises transmitting a representation of first instructions to a proxy server application disposed within the managed network, and wherein reception of the representation of the first instructions causes the proxy server application to transmit the first instructions to the first server device.

18. The method of claim 11, wherein initiating the discovery scan of the first and second server devices comprises logging on to the first server device using account credentials related to the managed network, and wherein the first configuration and operational information for the first service is obtained by way of application programming interfaces.

19. The method of claim 18, wherein the graphical user interface allows the data to be modified, and wherein modifying the data involves defining relationships between the first service and the second service.

20. An article of manufacture including a non-transitory computer-readable medium, having stored thereon program instructions that, upon execution by a computing device of a remote network management platform that manages a managed network, cause the computing device to perform operations comprising:

initiating a discovery scan of first and second server devices, wherein the first and second server devices are not in the managed network;

receiving first and second respective sets of configuration and operational information from the first and second respective server devices for first and second respective services provided to the managed network, wherein the first and second services are offered by different entities and have different configurations;

storing the first and second respective sets of configuration and operational information for the first and second respective services in a database; and providing a graphical user interface representing data corresponding to the first and second services.

\* \* \* \* \*